Oct. 22, 1963 W. H. BANCROFT 3,108,205
VOLTAGE SENSING CONTROL CIRCUIT
Filed May 2, 1958

INVENTOR.
WALTER H. BANCROFT.
BY
JPSanto
ATTORNEY.

United States Patent Office 3,108,205
Patented Oct. 22, 1963

3,108,205
VOLTAGE SENSING CONTROL CIRCUIT
Walter H. Bancroft, Philadelphia, Pa., assignor to Burroughs Corporation, Detroit, Mich., a corporation of Michigan
Filed May 2, 1958, Ser. No. 732,712
8 Claims. (Cl. 317—31)

This invention relates to power supply protective control systems, and, more particularly, to an improved over voltage, under voltage and fault sensing protective control circuit for sensing any of these voltage conditions in any one of the output supply conductors of a multiple circuit voltage distribution system or power supply of the type furnishing a plurality of separately developed output voltages of the same or several different voltage levels to a plurality of different loads.

The invention has among its general objects to provide improvements in sensing control circuits for systems of the above character from the standpoint of decreasing the cost and power consumption and improving the reliability of the control system.

A specific object is to provide a sensing control circuit of the aforementioned character embodying principles of simple logical circuitry design for multiple output circuit power supplies and voltage distribution systems.

Another object is to provide an improved sensing control circuit of the above character which uses a minimum number of control relays therein.

Figure 1:
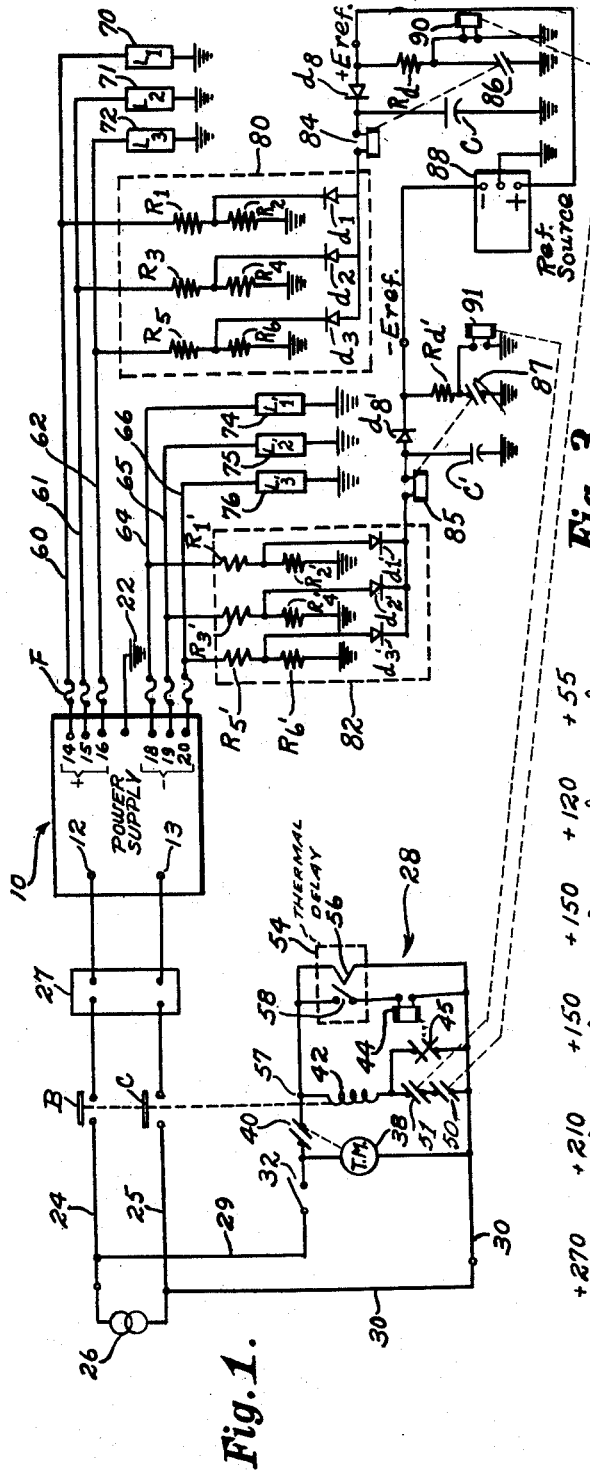
Figure 3:
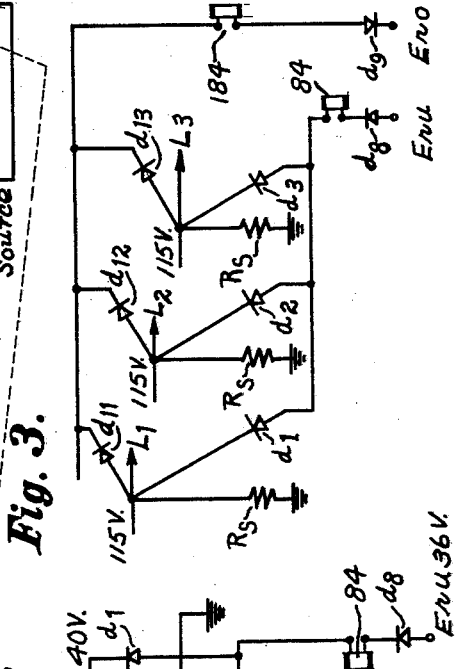
Figure 2:
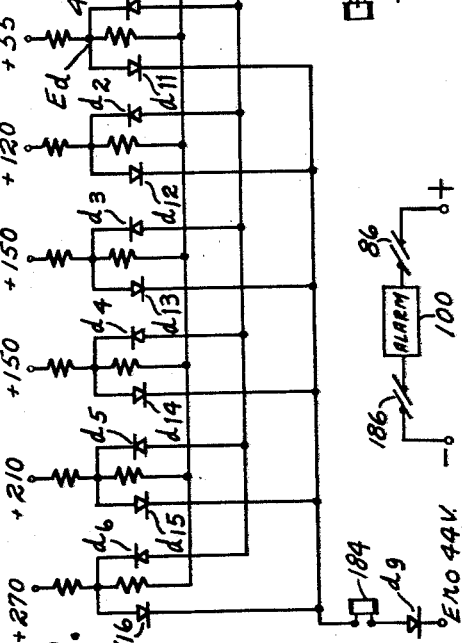

Other objects together with the advantages and features attending the invention may be appreciated from a consideration of the following detailed description and drawings, wherein:

FIG. 1 is a schematic circuit diagram of a voltage sensing control circuit in accordance with the present invention and embodied in a multiple level D.C. power supply for sensing a loss of voltage of any one of the output supply conductors of a multiple output level power supply delivering a plurality of separately developed voltages of different voltage levels over a plurality of different supply conductors to a plurality of different loads;

FIG. 2 is a schematic circuit diagram of a voltage sensing control circuit for sensing an under voltage, loss of voltage and over voltage condition in a voltage distribution system of the above character; and FIG. 3 is a slightly modified version of the sensing control circuit of FIG. 2 for use in a distribution network in which all of the supply conductors operate at the same voltage level.

In the embodiment of the invention, illustrated in FIG. 1 of the drawings, 10 represents a D.C. power supply having a pair of A.C. input terminals 12, 13 and a plurality of output terminals 14, 15, 16 and 18, 19, 20, furnishing output voltages of different potential levels poled positively and negatively relative to ground, indicated at 22. The input terminals are connected over circuit mains 24, 25 to an A.C. power source 26 and thence, if desired, through a constant voltage power transformer 27, and through a pair of interrupter contacts B, C, operated or controlled from a power supply system 28 which is shown herein in somewhat simplified form, but is based on that shown and claimed in copending U.S. Patent 2,839,709 issued June 17, 1958, of common ownership herewith.

The control system is shown connected to the A.C. mains over line conductors 29 and 30 and may include a manually operable key switch 32, connected in line conductor 29; a first circuit branch which includes a timing motor or relay 38 returned to line conductor 30 and having a set of normally open contacts 40; a second circuit branch that is connected across the timing relay 38 and includes the normally open contacts 40 of the latter relay connected to one side of the power or circuit breaker relay 42, which is associated with the interrupter contacts B, C and has its other side returned to line conductor 30 over a pair of alternate circuit paths, one of which includes a set of normally closed contacts 45 of a control relay 44 and the other path includes two serially connected sets of normally open contacts 50 and 51 of a pair of control relays 90 and 91, later to be described; and a third circuit branch which includes normally open contacts 40, a thermal delay relay device 54 having a thermal element 56, which is connected to circuit point 57 and to return circuit conductor 30, and a set of normally open contacts 58 one side of which is connected to the circuit point 57 and the other side to one side of the aforementioned control relay 44 returned to line conductor 30, as shown.

The output terminals of the power supply are connected over individual output supply conductors or buses 60, 61, 62 and 64, 65 and 66 to separate load circuits indicated at 70, 71, 72 and 74, 75 and 76, and may be individually fused externally of the power supply as shown at F. Alternatively, the fuses may be located interiorly of the power supply in the respective rectified output sections thereof, as in the patent referenced above.

In order to protect the power supply against undesirable effects and harm resulting from a loss of voltage condition or failure of the output voltages to come on or to rise to their rated levels, the embodiment of the invention illustrated in FIG. 1 provides for each set of positive and negative supply conductors a fault sensing protective control circuit in the form of a logical OR circuit or diode buffer 80, 82 and a voltage responsive sensing device 84, 85. The voltage responsive devices may be instruments type meter relays known in the art each having a set of normally open contacts 86, 87 which are caused to close when the potential difference across the terminals of the relay devices attains a predetermined or preset operating value. Each gate circuit includes a voltage divider network R1, R2; R1', R2'; R3, R4; R3', R4'; and R5, R6; R5', R6' for each of the output supply conductors; and individual diodes $d1$, $d1'$; $d2$, $d2'$; and $d3$, $d3'$, each connected to the junction or dividing point of a different one of the divider networks and to one side of an associated sensing relay 84, 85 and poled as shown.

The other side of each of the positive and negative voltage sensing relays 84, 85 is connected through an isolating diode $d8$, $d8'$ poled as shown and connected to a terminal of a similarly poled battery or regulated D.C. reference voltage source 88. The reference voltage side of each of the isolation diodes $d8$, $d8'$ is connected to ground through a voltage dropping or current limiting resistor $Rd$, $Rd'$ and a parallel circuit path, one path of which includes the normally open contacts 86, 87 of a respective one of the voltage sensing devices 84, 85 and the other path the coil of one of the aforementioned control relays 90, 91, the normally open contacts 50, 51 of which are connected in the input control circuit of the power supply, as shown. Connected between the relay side of each of the isolation diodes $d8$, $d8'$ and ground is a filter capacitor C, C', which serves to smooth voltage fluctuations and noise in the voltage applied to the voltage responsive relay devices.

The magnitude of the reference voltage and the resistance values of the voltage divider networks are chosen so that under normal operating conditions the voltage drop across each of the separate divider resistors R2, R2'; R4, R4'; and R6, R6' will be approximately equal to the reference voltage and may be made equal to the normal pull-in or operating voltage of the particular relay or device 84, 85 selected for the sensing function, say ±5 volts in FIG. 1, but in other applications of the invention different voltages may be used.

The power supply is placed in operating condition by closing the key switch 32 to energize and start the timing cycle of the timing motor relay 38. After a predetermined time, the relay 38 closes its contacts 40 to energize the breaker contact controlling power relay 42 through the normally closed contacts 45 of the de-energized control relay 44 and to supply heating current to the thermal element 56 of the thermal delay relay. Energization of the power relay 42 closes the breaker contacts B, C to supply power to the several transformer supplied rectifier circuits included within the power supply from which separately developed rectified output voltages are delivered to the output supply terminals. Upon the expiration of the time cycle of the thermal delay relay 54, the switch contacts 58 thereof close to energize the control relay 44, which opens its normally closed contacts 45 to transfer the control and the continued energization of the power relay 42 to the contacts 50, 51 of the control relays 90, 91, the latter being energized when the output supply conductors are delivering their rated output voltages to their load circuits and the voltage responsive sensing relays 84, 85 are de-energized.

Under normal operating conditions, the control relays 90, 91 become energized within the time cycle of the thermal relay 54, during which time the output voltages of the power supply will have attained their designated operating levels. In the event of a D.C. failure of any one of the power supply output voltages, a current flow circuit path will be established from ground through one of the grounded divider resistors R2, R2'; R4, R4'; or R6, R6' and through the diode $d1$, $d1'$; $d2$, $d2'$; or $d3$, $d3'$; the voltage responsive control device 84, or 85, diode $d8$, $d8'$ and the reference voltage source 88 to ground to establish a potential difference across the voltage responsive device and cause it to close its contacts 86, 87 and drop out a related one of the control relays 90, 91 which opens its contacts 50, 51 in the power input control circuit of the power supply to drop out the power relay 42 and disable the supply.

Where conditions permit, it may be preferred to incorporate the voltage dividers as part of the bleeder network of the power supply in order to avoid duplication of resistors.

FIG. 2 illustrates an under voltage, over voltage and fault sensing protective control circuit utilizing the principles of the present invention and embodied in a multiple level power supply system supplying a plurality of separately developed, different voltages over a plurality of different suppy conductors to a plurality of different load circuits. In this case, a separate under voltage responsive device 84 and a separate over voltage responsive device 184 are provided for each set of positive and negative supply conductors, only the positive supply conductors being shown in FIG. 2. The fault and under voltage sensing circuit is generally similar to that of FIG. 1, the over voltage circuit requiring only the addition of another diode as $d11$, $d12$, $d13$ . . . connected to the division point of each of the divider networks and to one side of the over voltage responsive device 184 and poled as shown.

The resistance values of the voltage divider networks are chosen to provide a convenient, common operating potential $Ed$ at the division points of the networks, while the magnitudes of the under voltage and over voltage reference voltages $Eru$ and $Ero$ are chosen with respect to the voltage $Ed$ at the division points of the divider networks, the operating voltage $Evo$ of the voltage responsive devices 84, 184, and the minimum voltage change $\Delta$ expressed as a percentage of the rated supply voltages which it is desired to sense in any of the supply conductors and are related to the voltage $Ed$ at the division points of the divider network in accordance with the following expressions $$Eru = Ed - \Delta Ed + Evo \quad (1)$$

$$Ero = Ed + \Delta Ed - Evo \quad (2)$$

Thus, where it is desired to sense a ±20% change $\Delta$ in any of the 55, 120, 150, 210 and 270 volt supply conductors of FIG. 2, for example, and the voltage responsive devices 84, 85 have an operating voltage $Evo$ of say 4 volts, a convenient value for $Ed$ may be, say, 40 volts, whereupon the reference voltage $Eru$ for the under voltage responsive device 84 will be 36 volts and the reference voltage $Ero$ for the over voltage responsive device will be 44 volts. The invention is applicable to other percent changes in accordance with Formulas 1 and 2.

Under these conditions, the under voltage responsive device 84 will not operate until the voltage of one of the supply conductors changes by 20% to reduce the voltage at the division point of the divider network connected thereto also by 20% or 8 volts to a 32 volt level, which is below the reference under voltage $Eru$ by an amount corresponding to the 4 volt operating voltage of the under voltage responsive device. Thus, the under voltage responsive device will not operate until the voltage at the division point of one of the divider networks falls below the value of the division point voltage established for the rated supply voltages by the amount $\Delta Ed$ and to a level which is below the reference under voltage $Eru$ an amount corresponding to the operating voltage $Evo$ of the under voltage responsive device. Similarly, the over voltage responsive device 184 will not operate until the division point voltage of any one of the divider networks rises above the normally established value thereof by $\Delta Ed$ or 8 volts and to a level which is above the reference over voltage $Ero$ by the 4 volt operating level of the over voltage responsive device.

The current flow path for a loss of voltage or under voltage condition is similar to that described in FIG. 1, while the current flow path for a 20% over voltage condition, say, in the 270 volt supply of FIG. 2 is from ground and through the over voltage reference source, isolation diode $d9$, the over voltage responsive device 184, diode $d16$, the lower or grounded portion of the 270 volt divider network and back to ground. Under these conditions, the current flow will establish a sufficient potential drop across the coil of the over voltage responsive device 184 to operate the device. The contacts 86 and 186 of the under voltage and over voltage responsive control devices are shown connected in an auxiliary signal or alarm circuit including a signal or alarm device 100 energized from a suitable source.

While under normal operating conditions, the over voltage and under voltage reference voltages are above and below the normal division point voltage by 4 volts in the sensing system of FIG. 2, the diodes are so poled or biased to prevent current flow in the reverse direction through the over voltage and under voltage responsive device when the supply conductors are delivering their rated voltages.

FIG. 3 illustrates an over voltage, under voltage and voltage loss sensing control circuit for sensing a plurality of supply conductors delivering the same output voltage level to a plurality of different load circuits L1, L2, and L3. In this case, each of the divider networks may be replaced with a separate load shunting resistance $R_S$ of high resistance value, the high potential side of each of which is connected to the cathode of a different one of the diodes $d1$, $d2$, $d3$ connected to the under voltage responsive device 84 and to the anode of a different one of the diodes $d11$, $d12$, $d13$ connected to the over voltage responsive device 184. The magnitude of the reference under voltage $Eru$ and reference over voltage $Ero$ may be determined from the aforementioned expressions 1 and 2 in which the normal rated supply voltages of the equal level supply conductors is used for the value of $Ed$.

What is claimed is:

1. The combination with a power supply system for supplying a plurality of separately developed output voltages of independent voltage levels over a plurality of supply conductors to a plurality of different load circuits from a source of electrical power connected to the input of the system, of means for sensing a change in voltage of any of the supply conductors in excess of a given percentage change $\Delta$ in the rated voltage thereof including an undervoltage responsive control device and an overvoltage responsive control device, each operable for a given operating voltage E$vo$ impressed thereacross, a plurality of voltage dividers each connected to a different one of said conductors and proportioned to provide the same potential level E$d$ at the division point of each divider when the supply conductors are at their rated voltage levels, a plurality of pairs of oppositely poled diodes, a different one of said pairs for each of said dividers and one side of each diode in said pair connected between the division point of its divider and the other side of each of said diode in said pair connected to one side of a different one of said voltage responsive control devices, a reference voltage source connected to the other side of each of said voltage responsive control devices and supplying reference voltages E$ru$ and E$ro$ to the undervoltage and overvoltage responsive control devices respectively, whose magnitudes are expressed by the relationships $$Eru = Ed - \Delta Ed + Evo$$
$$Ero = Ed + \Delta Ed - Evo$$

and switching control means operated by said voltage responsive control devices and connected in the input of the power supply to disable the power supply in the event the voltage of any of the supply conductors should change from the rated value thereof by the aforesaid percentage change.

2. The combination with a power supply system for supplying a plurality of separately developed output voltages of independent voltage levels over a plurality of supply conductors to a plurality of different load circuits from a source of electrical power connected to the input of the system of means for sensing a reduction in voltage of any of the supply conductors in excess of a given percentage change $\Delta$ in the rated voltage thereof including an undervoltage responsive control device operable for a given operating voltage E$vo$ impressed thereacross, a plurality of voltage divider networks, each connected to a different one of said conductors and proportioned to provide the same potential level E$d$ at the division point of each divider when the supply conductors are at their rated levels, a plurality of diodes one of each connected between the division point of each divider and to one side of said undervoltage responsive control device and poled to prevent current flow from said source of electrical power to said under voltage responsive control device, a reference voltage source connected to the other side of said undervoltage responsive control device and supplying a reference voltage E$ru$ thereto whose magnitude is expressed by the relationship $$Eru = Ed - \Delta Ed + Evo$$

and switching control means operated by said undervoltage responsive control device and connected in the input of the power supply to disable the power supply in the event the voltage of any of the supply conductors should be reduced from the rated value thereof by the aforesaid percentage.

3. The combination with a power supply system for supplying a plurality of separately developed output voltages of independent voltage levels over a plurality of supply conductors to a plurality of different load circuits from a source of electrical power connected to the input of the system of means for sensing an increase in voltage of any of the supply conductors in excess of a given percentage change $\Delta$ in the rated voltage thereof including an overvoltage responsive control device operable for a given operating voltage E$vo$ impressed thereacross, a plurality of voltage divider networks, one of each connected to a different one of said conductors and proportioned to provide the same potential level E$d$ at the division point of each divider when the supply conductors are at their rated levels, a plurality of diodes, one of each connected between the division point of each divider and to one side of said overvoltage responsive control device, a reference voltage source connected to the other side of said overvoltage responsive control device and supplying a reference voltage E$ro$ thereto whose magnitude is expressed by the relationship $$Ero = Ed + \Delta Ed - Evo$$

and switching control means operated by said overvoltage responsive control device and connected in the input of the power supply to disable the power supply in the event the voltage of any of the supply conductors should increase from the rated value thereof by the aforesaid percentage change.

4. The combination with a power supply system for supplying a plurality of separately developed output voltages of equal voltage levels over a plurality of supply conductors to a plurality of different load circuits from a source of electrical power connected to the input of the power supply, of an undervoltage responsive control device and an overvoltage responsive control device, a plurality of high resistance devices one of each connected to a different one of said supply conductors and across the load circuit supplied therefrom, a plurality of pairs of oppositely poled diodes one pair for each resistance device and one side of each diode in said pair connected to the same side of the resistance device as the supply conductors and the other side of each pair of diodes connected to one side of a different one of said voltage responsive devices, a reference voltage source connected between the other side of each of said voltage responsive control devices and each resistance device and supplying different reference voltages thereto, and switching control means connected in the input of the power supply and operated by said voltage responsive control devices to disable the power supply upon an undervoltage or overvoltage condition of any one of said supply conductors.

5. The combination with a power supply system for supplying a plurality of separately developed output voltages of equal voltage levels over a plurality of supply conductors to a plurality of different load circuits from a source of electrical power connected to the input of the power supply, of a voltage responsive control device, a separate resistance device connected to each of said supply conductors and across the load circuit supplied therefrom, a plurality of unidirectional conducting devices one for each resistance device and connected to the supply conductor side of its resistance device and to one side of said voltage responsive device, a reference voltage source connected between the other side of said voltage responsive control device and each resistance device, and switching control means connected in the input of the power supply and operated by said voltage responsive control device.

6. The combination with a power supply system for supplying an output voltage over a supply conductor to a load from a source of electrical power connected to the input of the system, of means for sensing a change in voltage at said supply conductor in excess of a given percentage change $\Delta$ in the rated voltage thereof including an under voltage responsive control device and an over voltage responsive control device, each operable for a given operating voltage E$vo$ impressed thereacross, a voltage divider connected to said supply conductor and proportioned to provide a potential level E$d$ at its division point when the supply conductor is at its rated voltage level, a pair of oppositely poled diodes associated with the divider, one side of each of said pair of diodes connected to the division point of the divider and the other side of said diodes connected to one side of a different one of said voltage responsive control devices, a reference voltage source connected to the other side of each of said voltage responsive control devices and supplying reefrence voltages E$ru$ and E$ro$ to the under voltage and over voltage responsive control devices respectively, whose magnitudes are expressed by the relationships $$Eru = Ed - \Delta Ed + Evo$$

$$Ero = Ed + \Delta Ed - Evo$$

and switching control means operated by said voltage responsive control devices and connected in the input of the power supply to disable the power supply in the event the voltage of the supply conductor should change from the rated value thereof by the aforesaid percentage change.

7. The combination with a power supply system for supplying an output voltage over a supply conductor to a load from a source of electrical power connected to the input of the system of means for sensing a reduction in the voltage of said supply conductor in excess of a given percentage change $\Delta$ in the rated voltage thereof including an under voltage responsive control device operable for a given operating voltage E$vo$ impressed thereacross, a voltage divider connected to said conductor and proportioned to provide a potential level E$d$ at its division point when said supply conductor is at its rated level, a diode connected between the division point of the divider and one side of said under voltage responsive control device and poled to prevent current flow from said source of electrical power to said under voltage responsive control device, a reference voltage source connected to the other side of said under voltage responsive control device and supplying a reference voltage E$ru$ thereto whose magnitude is expressed by the relationship $$Eru = Ed - \Delta Ed + Evo$$

and switching control means operated by said under voltage responsive control devices and connected in the input of the power supply to disable the power supply in the event the voltage of the supply conductor should be reduced from the rated value thereof by the aforesaid percentage.

8. The combination with a power supply system for supplying an output voltage over a supply conductor to a load from a source of electrical power connected to the input of the system of means for sensing an increase in voltage at said supply conductor in excess of a given percentage change $\Delta$ in the rated voltage thereof including an over voltage responsive control device operable for a given operating voltage E$vo$ impressed thereacross, a voltage divider connected to said supply conductor and proportioned to provide a potential level E$d$ at its division point when said supply conductor is at its rated level, a diode connected between the division point of the divider and one side of said over voltage responsive control device, a reference voltage source connected to the other side of said over voltage responsive control device and supplying a reference voltage E$ro$ thereto whose magnitude is expressed by the relationship $$Ero = Ed + \Delta Ed - Evo$$

and switching control means operated by said over voltage responsive control devices and connected in the input of the power supply to disable the power supply in the event the voltage of the supply conductor should increase from the rated value thereof by the aforesaid percentage change.

References Cited in the file of this patent

UNITED STATES PATENTS

| | | |
|---|---|---|
| 2,601,473 | Van Weynsbergen | June 24, 1952 |
| 2,742,595 | Gross | Apr. 17, 1956 |
| 2,767,309 | Schauer | Oct. 16, 1956 |
| 2,768,336 | Shoultes | Oct. 23, 1956 |
| 2,791,739 | Light | May 7, 1957 |
| 2,811,675 | McGee | Oct. 29, 1957 |
| 2,839,709 | Baumgartner | June 17, 1958 |
| 2,839,743 | Baumgartner | June 17, 1958 |
| 2,894,176 | Hegarty | July 7, 1959 |
| 2,967,978 | Smith | Jan. 10, 1961 |

OTHER REFERENCES

Richards, R. K.: "Digital Computer Components and Circuits," pages 37–45.